United States Patent
Plourde et al.

(10) Patent No.: US 8,999,219 B2
(45) Date of Patent: Apr. 7, 2015

(54) AUDIBLE ZIPPER WITH LATERALLY CRUSHED ELEMENTS AND METHODS OF MANUFACTURE THEREOF

(75) Inventors: Eric Plourde, Frankfort, IL (US); Maurice Finnegan, III, Glenview, IL (US); Victor Matias, New Braunfels, TX (US); Steven Ausnit, New York, NY (US)

(73) Assignee: Illinois Tool Works Inc., Glenview, IL (US)

(*) Notice: Subject to any disclaimer, the term of this patent is extended or adjusted under 35 U.S.C. 154(b) by 342 days.

(21) Appl. No.: 13/397,138

(22) Filed: Feb. 15, 2012

(65) Prior Publication Data

US 2013/0207311 A1    Aug. 15, 2013

(51) Int. Cl.
*B29C 59/02* (2006.01)
*B29D 5/10* (2006.01)
*B65D 33/25* (2006.01)

(52) U.S. Cl.
CPC ............... *B29D 5/10* (2013.01); *B65D 33/255* (2013.01)

(58) Field of Classification Search
CPC .. B29C 59/021; B29C 59/043; B29C 67/0048
USPC .................................................. 264/299, 320
See application file for complete search history.

(56) References Cited

U.S. PATENT DOCUMENTS

| | | |
|---|---|---|
| 5,070,584 A | 12/1991 | Dais et al. |
| 5,138,750 A | 8/1992 | Gundlach et al. |
| 5,140,727 A * | 8/1992 | Dais et al. ................... 24/585.12 |
| 5,478,228 A | 12/1995 | Dais et al. |
| 5,647,100 A | 7/1997 | Porchia et al. |
| 5,878,468 A | 3/1999 | Tomic et al. |
| 5,962,040 A | 10/1999 | Dais et al. |
| 6,594,872 B2 | 7/2003 | Cisek |
| 6,713,152 B2 * | 3/2004 | Chen et al. ....................... 428/99 |
| 2012/0213454 A1* | 8/2012 | Price et al. ....................... 383/63 |

* cited by examiner

*Primary Examiner* — James Sanders
(74) *Attorney, Agent, or Firm* — McCarter & English, LLP

(57) ABSTRACT

Reclosable zippers for reclosable packages are disclosed. The zippers include male and female profiles. The female profiles are periodically inwardly and/or upwardly deformed in order to generate tactile and audible feedback when the zippers are opened or closed by the user. The deformation of the female profiles typically maintains the strength of the zipper.

23 Claims, 7 Drawing Sheets

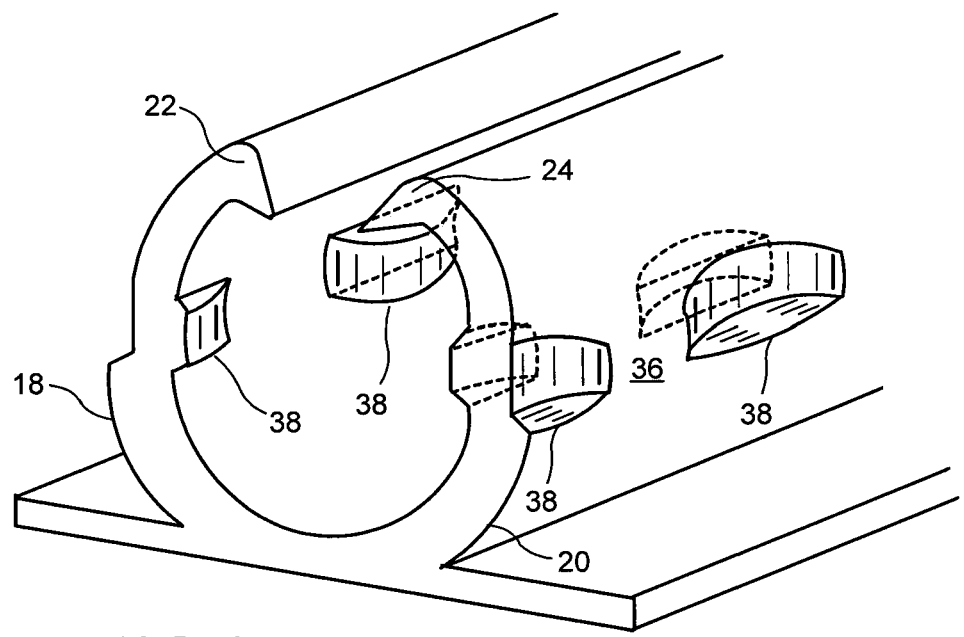
F I G. 4
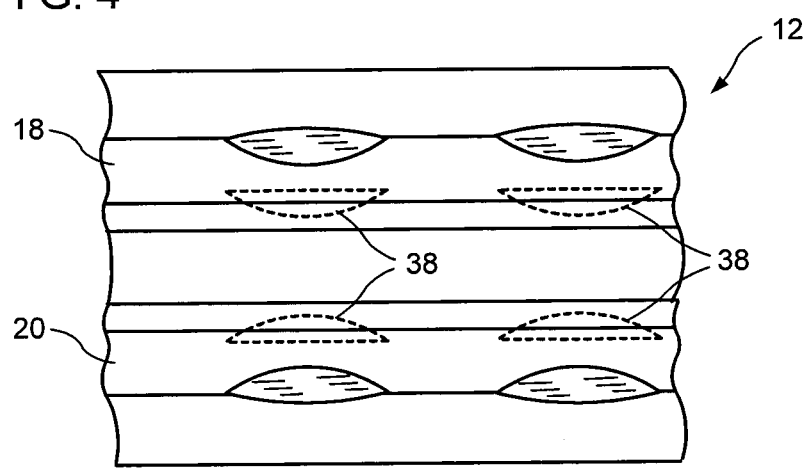
F I G. 5
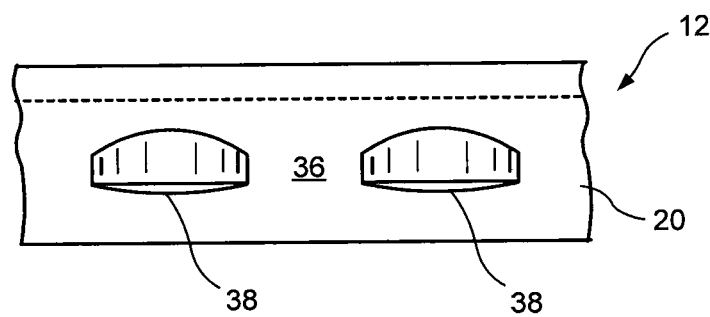
F I G. 6

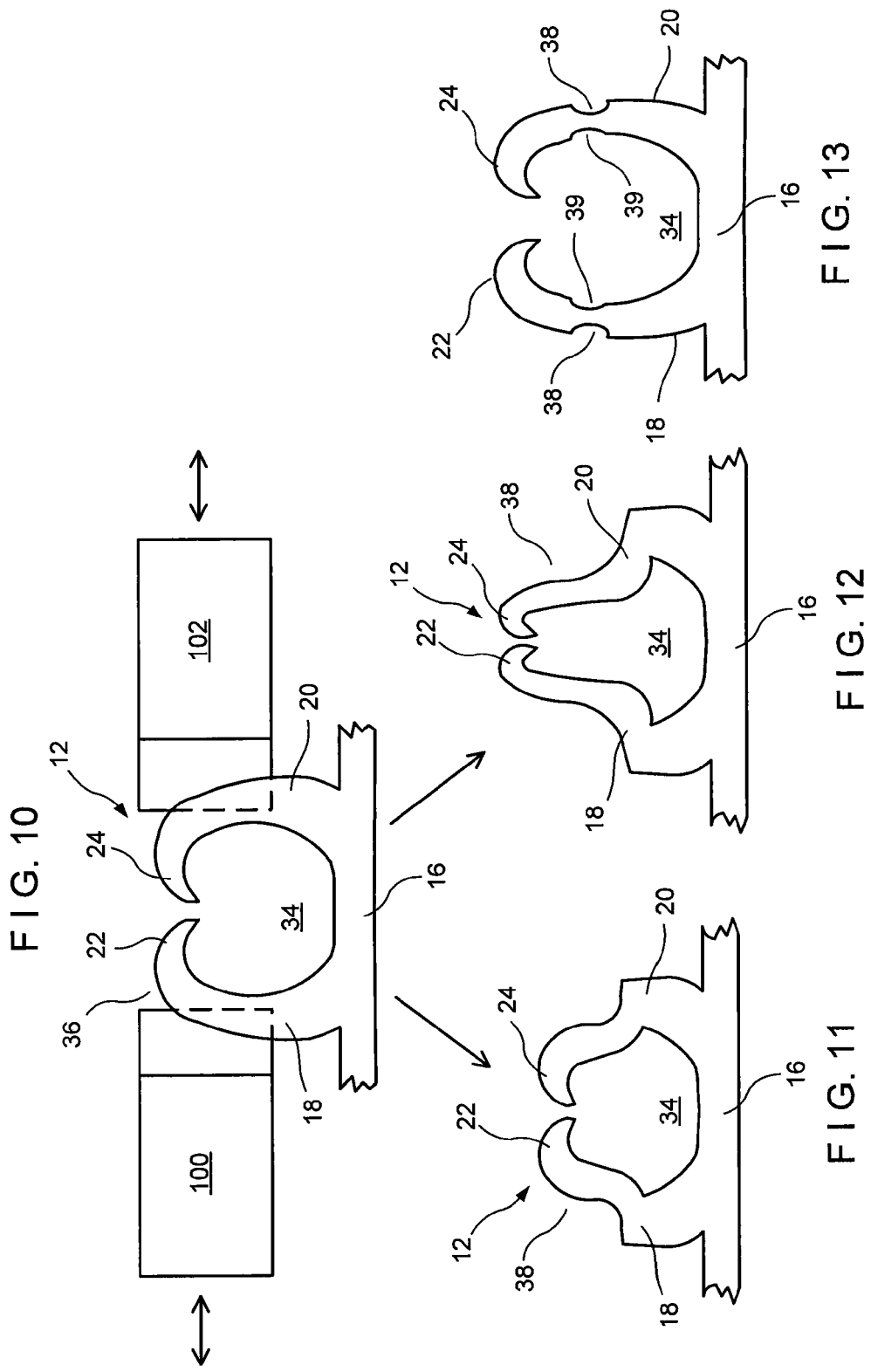

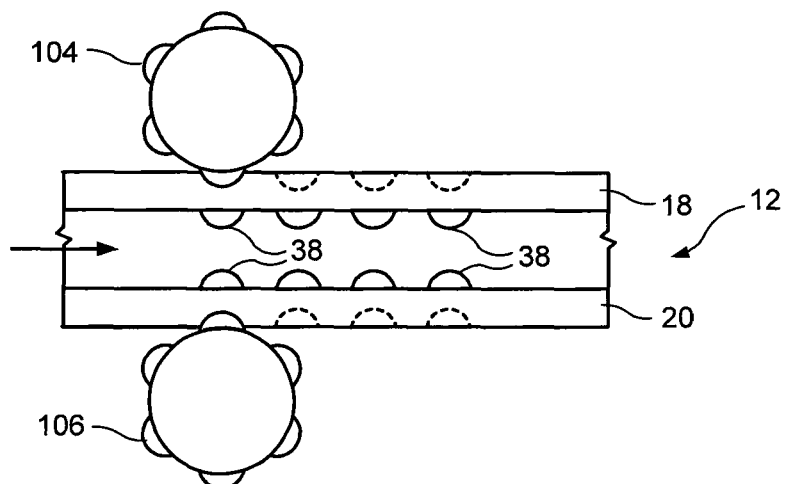
F I G. 17
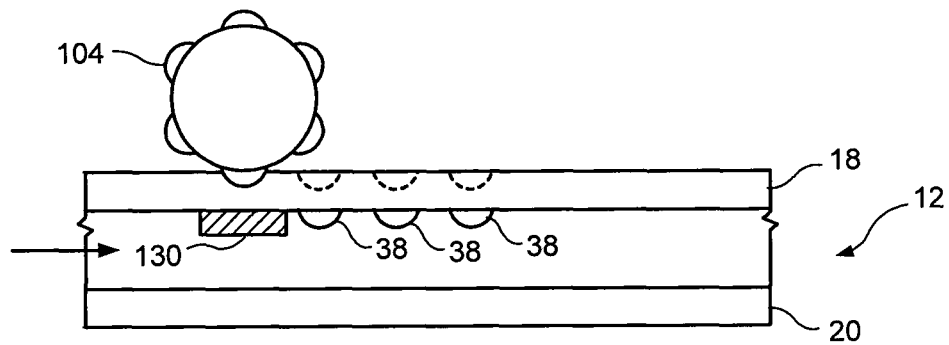
F I G. 18
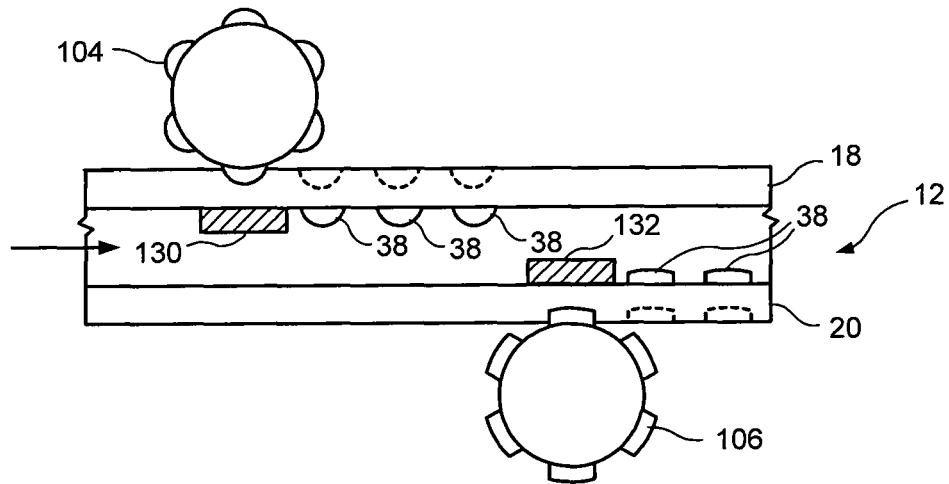
F I G. 19

US 8,999,219 B2

AUDIBLE ZIPPER WITH LATERALLY CRUSHED ELEMENTS AND METHODS OF MANUFACTURE THEREOF

BACKGROUND OF THE DISCLOSURE

1. Field of the Disclosure

The present disclosure relates to zippers for reclosable packages wherein the zipper profile is configured and arranged to produce audible and tactile feedback during opening and closing operations. In particular, the zipper includes laterally crushed female zipper profile elements.

2. Description of the Prior Art

In the prior art, it is known to deform male zipper profiles to produce a zipper which will produce audible and tactile feedback during opening and closing operations by the user. Examples of such prior art can be found in U.S. Pat. No. 6,594,872 entitled "Interlocking Closure Device", issued to Cisek on Jul. 22, 2003; U.S. Pat. No. 5,962,040 entitled "Apparatus for Making a Zipper for a Reclosable Thermoplastic Bag", issued to Dais et al. on Oct. 5, 1999; U.S. Pat. No. 5,878,468 entitled "Closure Arrangement for Reclosable Bag and Method Thereof", issued to Tomic et al. on Mar. 9, 1999; U.S. Pat. No. 5,647,100 entitled "Closure Member for a Reclosable Thermoplastic Bag", issued to Porchia et al. on Jul. 15, 1997; U.S. Pat. No. 5,478,228 entitled "Apparatus for Making a Zipper for a Reclosable Thermoplastic Bag" issued to Dais et al. on Dec. 26, 1995; U.S. Pat. No. 5,138,750 entitled "Zipper for Reclosable Thermoplastic Bag", issued to Gundlach et al. on Aug. 18, 1992; U.S. Pat. No. 5,070,584 entitled "Zipper for a Reclosable Thermoplastic Bag and a Process and Apparatus for Making", issued to Dais et al. on Dec. 10, 1991.

This cited prior art has deformed that male element of the zipper profile in order to produce the audible and tactile feedback. However, deformation of the male elements may, under some circumstances, reduce the mating strength and reliability of the zipper.

OBJECTS AND SUMMARY OF THE DISCLOSURE

It is therefore an object of the present disclosure to provide a zipper for a reclosable package wherein operation of the zipper provides an improved audible and tactile feedback to the user.

It is therefore a further object of the present disclosure to provide a zipper which maintains its strength and reliability.

These and other objects are attained by applying a crushing or compressing force at periodical intervals on the sides, top or both of a female profile, thereby plastically deforming the female profile such that the female profile remains deformed after the force is removed. The intermittent areas of deformation will produce vibrations thereby producing audible and tactile feedback, when the male profile is engaged with or disengaged from the female profile. Moreover, the inward deformation of the female elements depending on the deformation may increase the strength of the zipper. Similarly, as more mass is deformed by the deformation of the female element as compared to the male element, the resulting audible and tactile feedback is typically more robust.

BRIEF DESCRIPTION OF THE DRAWINGS

Further objects and advantages of the disclosure will become apparent from the following description and from the accompanying drawing, wherein:

FIG. 4 is a perspective view of a further embodiment of a female profile of the present disclosure.

FIG. 5 is a top view of a further embodiment of a female profile of the present disclosure.

FIG. 6 is a side view of a further embodiment of a female profile of the present disclosure.

FIG. 10 is an illustration of typical apparatus used to produce the periodic deformation of the female profile of the present disclosure.

FIG. 11 is a cross-sectional view of possible inward deformations of the female zipper profile pursuant to the present disclosure.

FIG. 12 is a cross-sectional view of further possible inward deformations of the female zipper profile pursuant to the present disclosure.

FIG. 13 is a cross-sectional view of still further possible inward deformations of the female zipper profile pursuant to the present disclosure.

FIG. 17 is a schematic of the use of two gears transversely across from each other inwardly deforming portions of legs of the female profile.

FIG. 18 is a schematic of a single gear inwardly deforming portions of a single leg of the female profile.

FIG. 19 is a schematic of two offset gears deforming portions of the legs of the female profile, with one leg being deformed differently from the other leg.

DETAILED DESCRIPTION OF THE PREFERRED EMBODIMENTS

Figure 1:
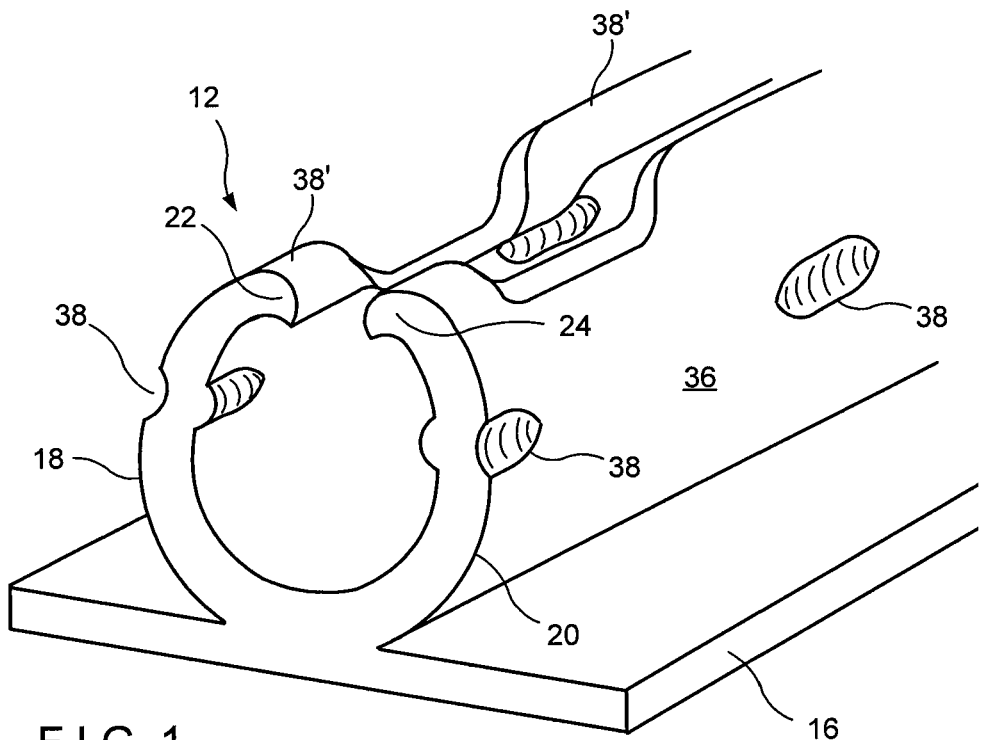
FIG. 1 is a perspective view of a female profile of the present disclosure, showing the periodic deformed areas of the female profile.
Figure 2:
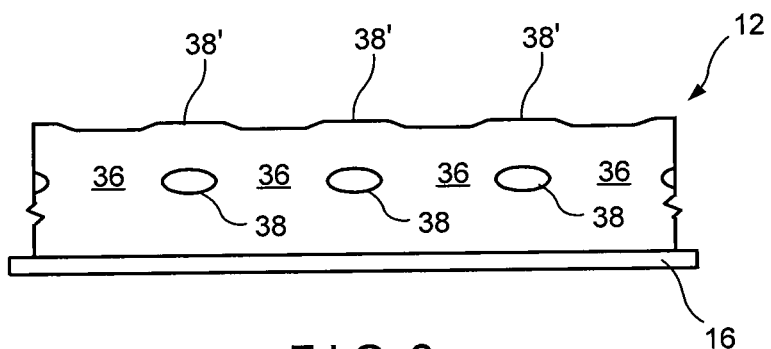
FIG. 2 is a side view of the female profile of the present disclosure.
Figure 3:
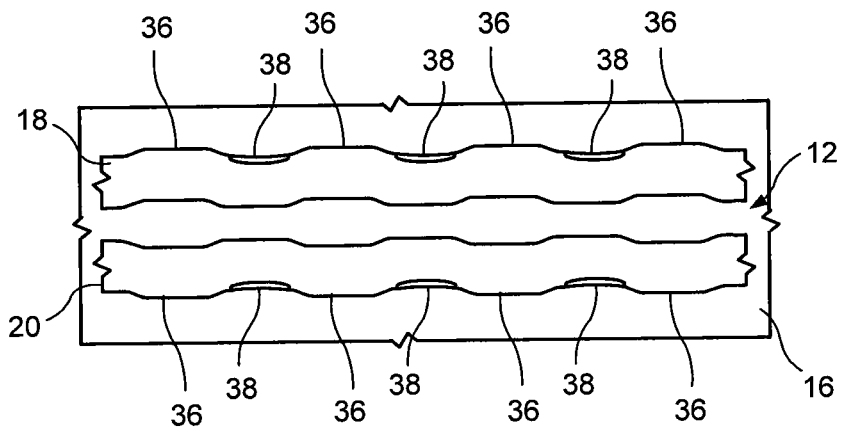
FIG. 3 is a top view of the female profile of the present disclosure.
Figure 8:
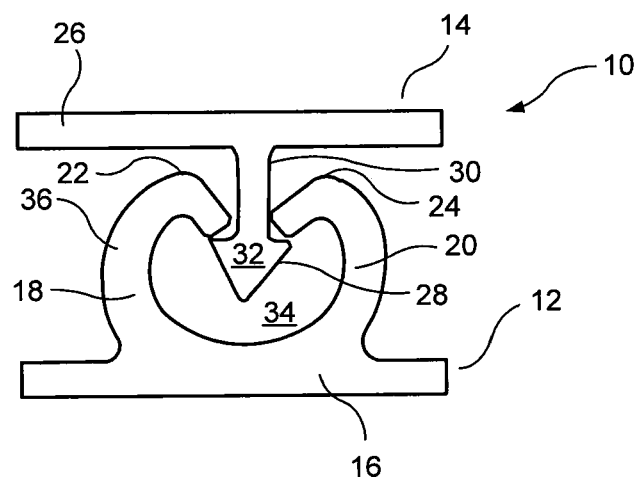
FIG. 8 is a cross-sectional view of the undeformed area of a female profile of the present disclosure, shown engaging a male profile.

Referring now to the drawings in detail wherein like numerals indicate like elements throughout the several views, one can see that FIG. 1-3 are various views of a female profile 12 of the present disclosure, while FIGS. 4-6 are various views of an alternative embodiment of a female profile 12. When combined with the male profile 14 as shown in FIG. 8, a zipper 10 is formed. Zipper 10 is typically for use with a reclosable package. Zipper 10, including female and male profiles 12, 14, may be made from conventional material such as, but not limited to, some form or blend of low density polyethylene, including low density polyethylene, linear low density, polyethylene, metallocene linear low density polyethylene, ethylene-vinyl acetate and similar materials. Additionally, use of high modulus materials may be incorporated into the zipper 10 in order to enhance the tactile and audible feedback, such as, but not limited to, polypropylene, high density polyethylene, or filler such as talc, cyclic olefin co-polymers, and similar materials or mixtures thereof.

As will be described, there are a number of methods of deforming the female profiles. The female profile can be deformed inwardly, or upwardly, so that the height of the female profile varies, or a combination of both. The deformations can take different shapes and be evenly or unevenly distributed along the longitudinal length of the female profile. Additionally, the deformations of the first arm can be similar or different from the deformations of the second arm. Moreover, some embodiments may have deformations on only one of the arms of the female profile.

Figure 7:
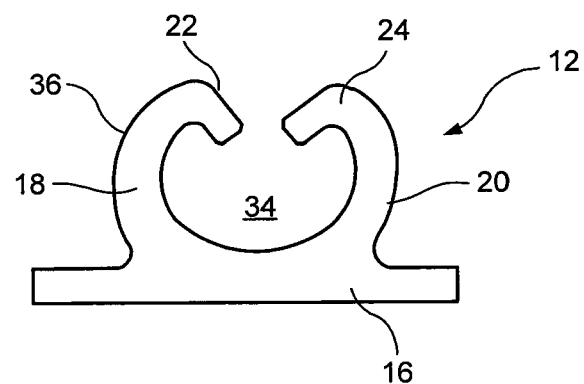
FIG. 7 is a cross-sectional view of the undeformed area of a female profile of the present disclosure.

As shown in FIGS. 1, 7 and 8, zipper 10 further includes female profile 12 which includes a base 16 and first and second upwardly extending female detent arms 18, 20 which terminate in respective first and second inwardly extending detent hooks 22, 24. Male profile 14 includes a base 26 and a male element 28 extending perpendicularly therefrom. Male element 28 includes post element 30 extending from base 26 terminating in an arrowhead-shaped detent element 32. In the closed and interlocked configuration shown in cross section in FIG. 8, male element 28 extends to within the space 34 defined between first and second upwardly extending female detent arms 18, 20 and first and second inwardly extending detent hooks 22, 24 engage and interlock with the male element 28 above the arrowhead-shaped detent element 32.

Figure 9A:
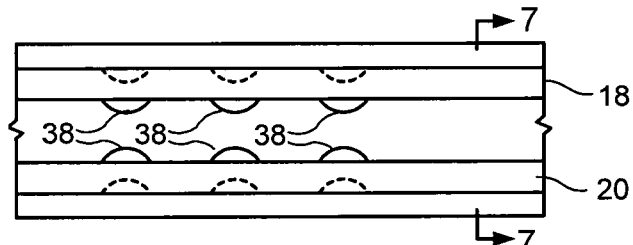
FIGS. 9A-9E are top plan views of the deformed female zipper profile, showing various arrangements of the deformations.
Figure 9B:
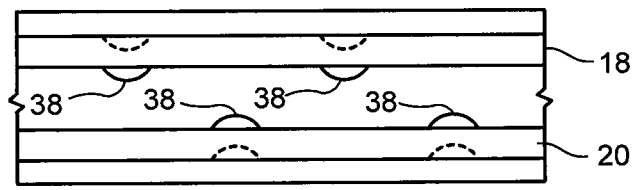
Figure 9C:
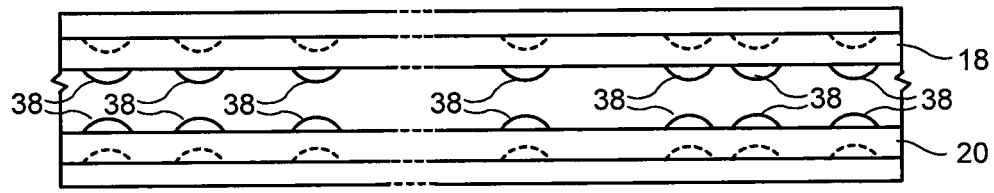
Figure 9D:
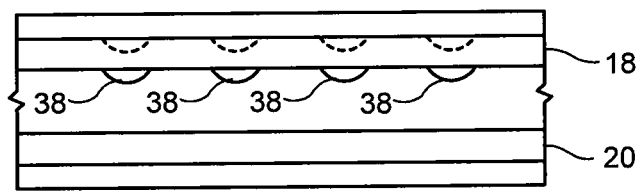
Figure 9E:
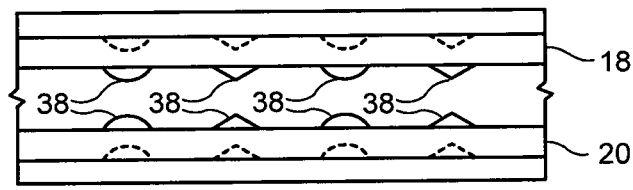

Furthermore, as shown in the various figures, first and second upwardly extending female detent arms 18, 20 include periodic inwardly deformed areas 38, which may, as shown in FIG. 1, further include upwardly deformed areas 38'. These inwardly deformed areas 38 (and/or upwardly deformed area 38') alternate with undeformed areas 36. These inwardly deformed areas 38 and upwardly deformed areas 38' cause increased tactile and audio feedback when the zipper 10 is opened or closed and further increases the strength of the engaged zipper. As will be described, there are a number of methods of deforming the female profiles. The female profile can be deformed inwardly, upwardly so that the height of the female profile varies, or a combination of both. As shown in FIGS. 9A-9E, the inwardly deformed portions 38 (or alternatively, with respect to each of FIGS. 9A-9E, upwardly deformed portions 38') can be arranged in various configurations. FIG. 9A illustrates the inwardly deformed portions 38 of first upwardly extending female detent arm 18 being adjacent (i.e., directly or transversely across from) to those of second upwardly extending female detent arm 20. FIG. 9B illustrates the inwardly deformed portions 38 of first upwardly extending female detent arm 18 being offset from those of second upwardly extending female detent arm 20. FIG. 9C illustrates non-uniform spacing between the inwardly deformed portions 38. FIG. 9D illustrates inwardly deformed portions 38 being formed on first upwardly extending female detent arm 18, with second upwardly extending female detent arm 20 being free of inwardly deformed portions 38. FIG. 9E illustrates how inwardly deformed portions 38 may have various shapes. As further shown in FIG. 1, the first and second upwardly extending female detent arms 18, 20 have alternating undeformed portions 36 and inwardly deformed portions 38 (along with upwardly deformed portions 38') wherein the inwardly deformed portions 38 may be formed in an alternating, periodic or intermittent manner. The distance between the deformed and undeformed portions may vary. These distances may be even or uneven. Similarly, this principle may be incorporated into a double zipper. The principle of the method of deformation of inwardly deformed portions 38 is illustrated in FIGS. 10-13. In FIG. 10, an undeformed section of female zipper profile 12 is presented to crushers 100, 102 (or, alternately, as described herein, rotating gears). This undeformed section of female zipper profile 12 may be at room temperature. Alternately, it still may be relatively soft from retention of the heat of the extrusion process which formed it, or it can be reheated to aid in the deformation or crushing process. First and second crushers 100, 102 impinge against respective first and second upwardly extending female detent arms 18, 20 thereby upwardly crushing first and second upwardly extending female detent arms 18, 20 to achieve the upwardly crushed configurations of deformed portions 38, 38' of FIGS. 11-13. The deformations illustrated in FIG. 11 are above the base 16 and likewise below the apices of the first and second upwardly extending female detent arms 18, 20. Additionally, the deformation illustrated in FIG. 13 includes a pinch structure 39 at the middle of the upwardly extending female detent arms 18, 20. However, in other envisioned embodiments, the frequency and size of the crushed areas can be modified to produce the desired effect and can even be varied along the length of the zipper 10. The elevation and height of the crush can be varied such that the entire height of the female profile 12 is crushed, from base 16 to the first and second inwardly extending detent hooks 22, 24, or just a vertical portion of the female profile 12, or just the top sections of the female profile.

First and second crushers 100, 102 may be implemented as first and second rotating bevel gears 104, 106 (see FIG. 14), wherein the spaces between successive gears would allow for the alternating undeformed portions 36 between inwardly (or upwardly) deformed portions 38 (as shown in FIG. 1), or as reciprocating opposed anvils, the reciprocation of which would allow for alternating undeformed portions 36 or inwardly (or upwardly) deformed portions 38. Other embodiments use opposed gears with parallel vertical axes of rotation without the need for beveling. Still further envisioned embodiments include using a single gear opposed with a a non-toothed roller or a flat plate whereby only a single detent arm 18, 20 is deformed and the other detent arm is left intact or whereby different deformations may be formed on different arms of the female profile.

Figure 14:
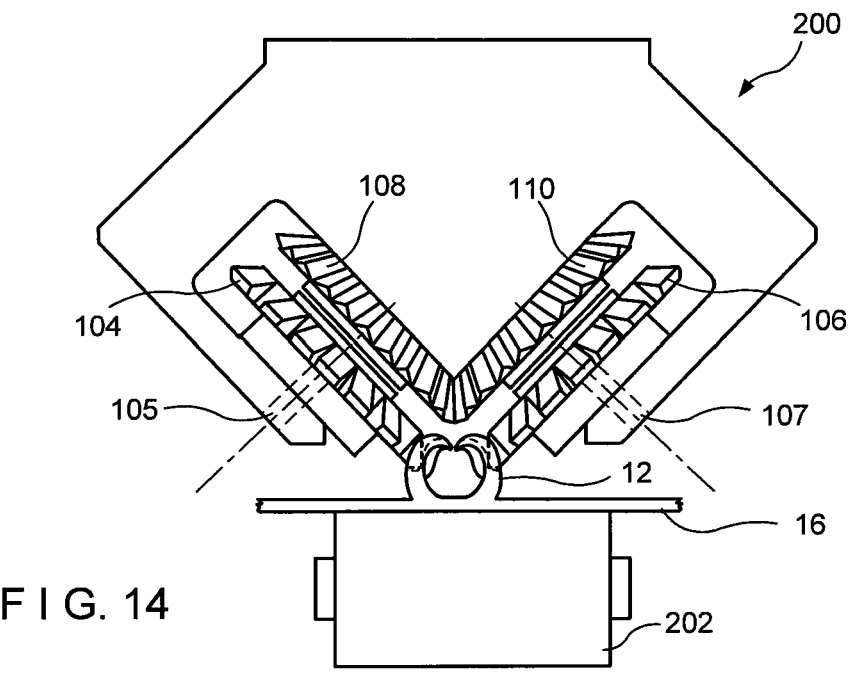
FIG. 14 is a plan view of another typical apparatus used to produce the periodic inward deformations of the female profile of the present disclosure.
Figure 15:
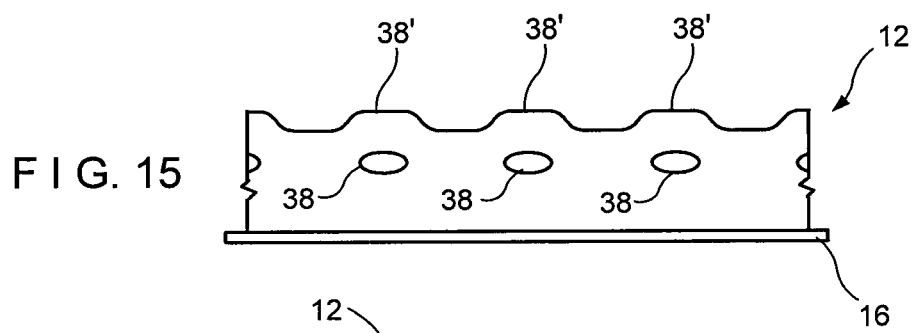
FIG. 15 is a side plan view of the female profile, after operation of the device of FIG. 14.
Figure 16:
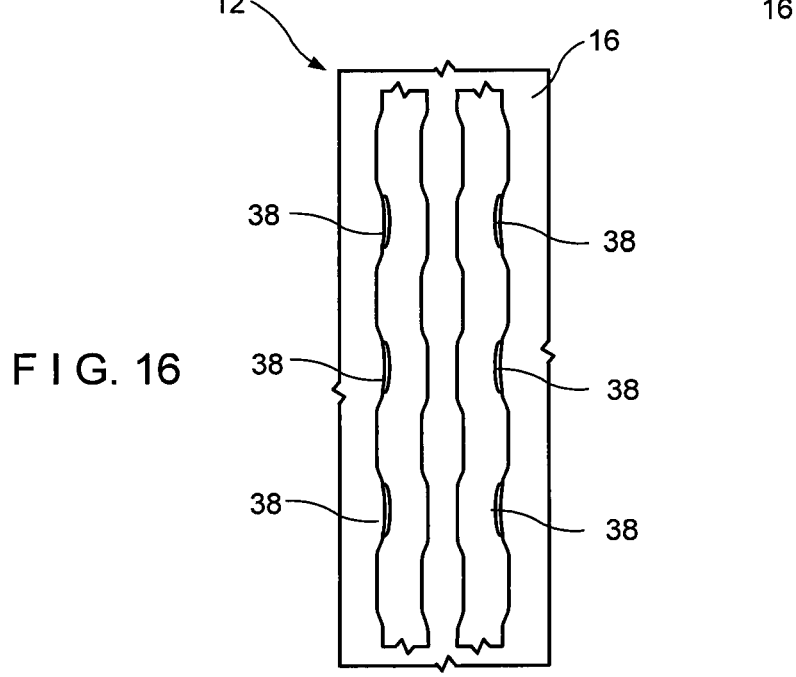
FIG. 16 is a top plan view of the female profile, after operation of the device of FIG. 14.

FIG. 14 illustrates an alternative apparatus 200 for inwardly and downwardly deforming the first and second upwardly extending female detent arms 18, 20 of the female profile 12, as transported by roller 202. The deforming function is performed by the teeth of first and second rotating bevel gears 104, 106. First and second rotating gears bevel 104, 106 are oriented at a ninety degree angle (i.e., a right angle) with respect to each other, and at a forty-five degree angle with respect to the base 16 of female profile 12. Typically, one of first and second intermeshing drive bevel gears 108, 110 is rotationally driven by a rotary source (not shown) and the other of first and second intermeshing drive bevel gears 108, 110 rotates in concert therewith, whereby both first and second rotating bevel gears 104, 106 are driven. Alternately, the female profile 12 may be positioned between the first and second rotating gears bevel 104, 106 and pulled therethrough, thereby causing the gears 104, 106 to rotate. Again, while the undeformed and inwardly deformed portions 36, 38 are shown as having approximately equal longitudinal length, other embodiments may have different ratios, including those with much longer inwardly deformed portions 38 than undeformed portions 36.

FIGS. 17-19 illustrate various possible placements of the first and second gears 104, 106. In FIG. 17, first and second gears 104, 106 are directly across from each other with first and second gears 104 impinging against first upwardly extending female detent arms 18, 20, respectively, to form inwardly deformed portions 38. In FIG. 18, first gear 104 is a single opposed with respect to first plate 130 and impinges against first upwardly extending detent arm 18 to form inwardly deformed portions 38 while no inwardly deformed portions 38 are formed on second upwardly extending detent arm 20. In FIG. 18, first and second gears 104, 106 are offset from each other and are opposed to respective first and second plates 130, 132, thereby forming inwardly deformed portions 38 in respective first and second upwardly extending female detent arms 18, 20. The gears 104, 106 of FIGS. 17-19 are not necessarily drawn to scale with respect to the female profile 12.

In this way, a zipper for a reclosable package is formed, wherein the zipper produces audible and tactile feedback during operation. Furthermore, the inward deformation of the female profiles may aid in increasing the strength of the zipper.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A method of producing a zipper for a reclosable package, including the steps of:
   providing a length of first zipper profile including a male element;
   providing a length of second zipper profile including a female element, wherein the female element includes a space for receiving the male element;
   inwardly deforming segments of the female element whereby inwardly deformed segments alternate with undeformed segments along the length of second zipper profile; and
   wherein the step of inwardly deforming segments of the female element results in spacing between successive inwardly deformed segments wherein a distance between a first pair of adjacently successive inwardly deformed segments is different from a distance between a second pair of adjacently successive inwardly deformed segments.

2. The method of claim 1 wherein the female element includes first and second extending arms terminating in respective first and second inwardly extending detent hooks, thereby forming the space therebetween for receiving the male element, the male element including a post element which terminates in an arrowhead-shaped element, and wherein the female element engages with the male element by the first and second detent hooks engaging the arrowhead-shaped element.

3. The method of claim 2 wherein the lengths of first and second zipper profile are formed from a material chosen from the group consisting of low density polyethylene, linear low density polyethylene, metallocene linear low density polyethylene, ethylene-vinyl acetate, polypropylene, high density polyethylene and mixtures thereof.

4. The method of claim 2 wherein at least one of the first and second zipper profiles include a filler chosen from the group consisting of talc and cyclic olefin co-polymers, and mixtures thereof.

5. The method of claim 2 wherein the step of inwardly deforming segments of the female element is performed by at least one reciprocating anvil.

6. The method of claim 2 wherein the step of inwardly deforming segments of the female element is performed by first and second opposed reciprocating anvils.

7. The method of claim 2 wherein the step of inwardly deforming segments of the female element is performed by first and second gears.

8. The method of claim 7 wherein a gap is formed between the first and second gears whereby at least a portion of the female element can pass through the gap during the step of inwardly deforming segments of the female element.

9. The method of claim 8 wherein the first and second gears are respective first and second bevel gears.

10. The method of claim 9 wherein the first and second bevel gears are oriented at a right angle with respect to each other.

11. The method of claim 10 wherein the first and second bevel gears rotate in concert with respective first and second drive gears.

12. The method of claim 1 further including a step of heating the length of second zipper material prior to the step of inwardly deforming segments of the female element.

13. The method of claim 1 further wherein the step of providing a length of second zipper material includes a step of extruding the length of second zipper material and wherein the step of inwardly deforming segments of the female element is performed while the length of second zipper material retains a portion of heat from the step of extruding.

14. The method of claim 1 wherein the step of inwardly deforming segments of the female element is applied to a portion of the female element.

15. The method of claim 2 wherein deformations of the first extending arm are adjacent to deformations of the second extending arm.

16. The method of claim 2 wherein deformations of the first extending arm are offset from deformations of the second extending arm.

17. The method of claim 2 wherein deformations on the first extending arm have a different shape from deformations on the second extending arm.

18. The method of claim 2 wherein deformations are formed on the first extending arm and wherein the second extending arm is free of deformations.

19. The method of claim 1 wherein the step of inwardly deforming segments of the female element further includes the step of upwardly deforming segments of the female element.

20. The method of claim 1 wherein the step of inwardly deforming segments of the female element forms a pinched structure in at least one of the first and second upwardly extending arms.

21. The method of claim 1 wherein the step of deforming segments of the female element is performed by two adjacent gears.

22. The method of claim 1 wherein the step of deforming segments of the female element is performed by a single gear.

23. The method of claim 1 wherein the step of deforming segments of the female element is performed by a plurality of offset gears.

* * * * *